April 9, 1957  P. JONES  2,787,856
FLOAT FISHING DEVICE
Filed Dec. 6, 1955

INVENTOR.
PARK JONES
BY
ATTORNEY

United States Patent Office 2,787,856
Patented Apr. 9, 1957

2,787,856

FLOAT FISHING DEVICE

Park Jones, Baxter Springs, Kans.

Application December 6, 1955, Serial No. 551,305

7 Claims. (Cl. 43—15)

This invention relates to fishing devices, and more particularly to an improved fishing float having means for imparting a sudden jerk upon the line, in order to set the hook in the mouth of the fish when the fish strikes at the bait attached to the hook.

An important object is to provide a fish catching device for attachment to a fishing line which will not be accidentally sprung prematurely during casting, due to the fact that the fishing line tends to hold the trigger means in a "set" or locking position at all times during the casting motion.

Another object is to provide a fish catching device which utilizes a single length only of line, and is readily adjustable with respect to the line for fishing at any desired depth.

Another object is to provide in a fishing device or float of the above-mentioned character means for adjusting the sensitivity of the trigger or releasing element, so that the device may be actuated or sprung with a very slight or a relatively heavy pull upon the fish hook, as found desirable under various conditions.

A still further object is to provide a fishing device of the above-mentioned character which is reliable and efficient in operation, simplified and durable, and relatively inexpensive to manufacture.

Other objects and advantages of the invention will be apparent during the course of the following description.

Figure 1:
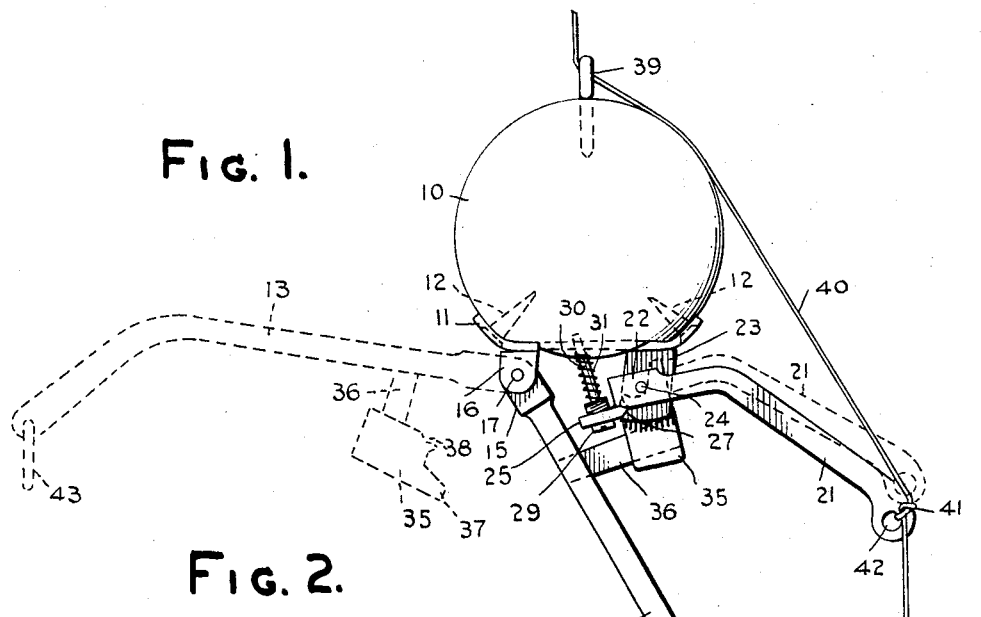
Figure 2:
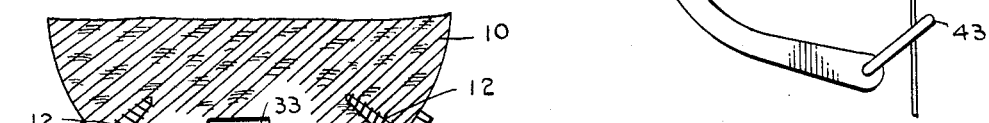
Figure 4:
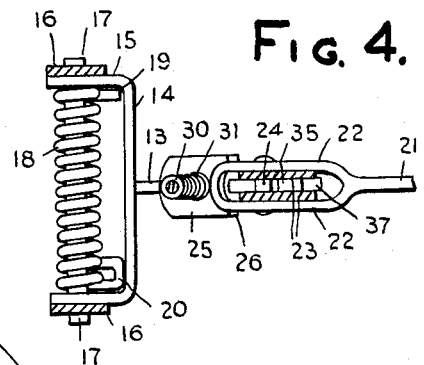
Figure 3:
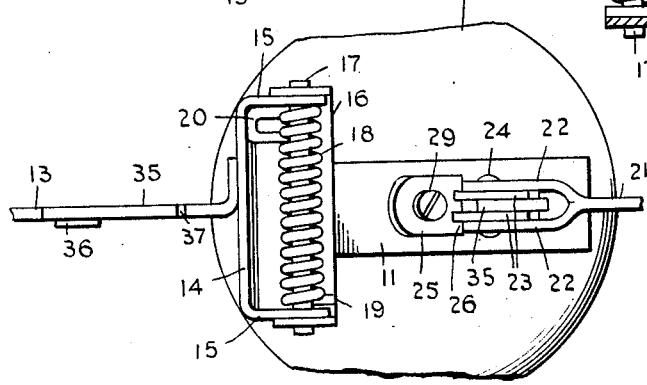

In the accompanying drawings, forming a part of this application, and in which like numerals are employed to designate like parts throughout the same, Figure 1 is a side elevation of a fishing device or float embodying the invention in the set or tensioned position, prior to being sprung by fish, the device being shown in the released or sprung position in broken lines, Figure 2 is an enlarged fragmentary central vertical section through the device illustrated by Figure 1, Figure 3 is a fragmentary bottom plan view of the device in the sprung position, and, Figure 4 is a fragmentary horizontal cross section taken substantially on line 4—4 of Figure 2.

In the drawings, where for the purpose of illustration is shown a preferred embodiment of the invention, the numeral 10 designates a float body portion of cork or the like, which may be shaped as a sphere, as shown, or any other shape found desirable. A substantially rigid mounting plate 11 is rigidly secured to the bottom of the float body portion 10, as by screws 12, and this mounting plate has all of the operating elements to be described hereinafter secured to it.

A line jerking or pulling arm 13 is provided, and this arm has a generally U-shaped yoke 14 rigidly secured to its end adjacent the body portion 10. The sides 15 of yoke 14 engage inwardly of the corresponding sides of an inverted U-shaped bracket 16, rigidly secured to the bottom of the mounting plate 11 near one side thereof, and in depending relation thereto. The sides 15 and the corresponding sides of the bracket 16 are apertured for the reception of a suitable pin 17, which serves to pivotally secure the arm 13 to the bracket 16. The arm 13 is preferably generally L-shaped as shown in Figure 1, although this shape is not extremely critical and may be varied somewhat if desired.

A rather strong torsional coil spring 18 surrounds the pin 17, inwardly of the yoke sides 15, and one end 19 of this spring reacts against the top of the bracket 16, Figure 2, whereas its opposite end 20, which may be formed into a loop, Figure 3, reacts or bears against the swingable yoke 14. Thus, when the arm 13 is swung to the right or counterclockwise in Figure 1, the spring 18 is wound up and placed under tension. In this condition, the spring 18 tends to return the arm 13 to the dotted line position shown in Figure 1.

An adjustable release lever or trigger 21 is provided, and the lever 21 is preferably generally L-shaped, as shown in the drawings for best coaction with the arm 13. The upper generally horizontal portion of the lever 21 is formed to provide a loop having sides 22, Figure 4, which receive between them a pair of relatively closely spaced lugs 23, dependingly rigidly secured to the mounting plate 11 near its side remote from the bracket 16. The sides 22 and lugs 23 are apertured to receive a suitable pin 24, which serves to pivotally secure the lever 21 to the lugs 23. A latch plate 25 or detent is rigidly secured by welding or the like to the lower side of the loop 22, adjacent its inner end and inwardly of the lugs 23, as best shown in Figure 2. The detent 25 has a bevelled or knife-like edge 26 projecting slightly forwardly of the inner end of the loop 22 and adapted for engagement within V-shaped notches 27 formed in the inner generally vertical edges of the lugs 23, whereby the knife-like edge 26 may project a slight distance in between the lugs 23 when the lever 21 is in the position shown in Figure 2.

The latch plate 25 has a screw-threaded opening 28 formed therethrough for the reception of an adjusting screw 29 having an upwardly extending shank 30, surrounded by a compressible coil spring 31. The upper end of the shank 30 projects through a clearance slot 32 in the mounting plate 11 and into a cavity 33 in the bottom of the float body portion 10, Figure 2. The upper end of the spring 31 bears against a flat washer 34 which is freely slidable upon the bottom of the mounting plate 11, the shank 30 being readily movable through the slot 32 and cavity 33 when the lever 21 swings upon its pivot 24. The lower end of the spring 31 bears upon the screw 29, which is rigid with the reduced shank 30. By turning the adjusting screw 29 within the screw-threaded opening 28, the tension of the spring 31 may be adjusted to regulate the sensitivity of the lever or trigger 21, as will be further described. As is obvious, the spring 31 tends to shift the arm or trigger 21 toward its dotted line position in Figure 1 at all times.

A latch dog 35, in the form of a flat rigid plate is rigidly secured by welding or the like to a short transverse extension 36, in turn suitably rigidly secured to the arm 13, somewhat below its upper end. The latch dog 35 projects above the extension 36 and has a reduced upper extension 37 adapted to enter between the lugs 23, forwardly of the pin 24, as shown in Figure 2. The rear edge of the latch dog 35 has a V-shaped notch 38 formed therein to receive the knife-like edge 26 of the detent 25, Figure 2. The purpose of having the extension 37 passed between the lugs 23 when the arm 13 is in the locked or set position, Figure 1, is to prevent sidewise or lateral shifting of the arm 13 with respect to the lever 21 and lugs 13, and to add strength and stability to the mechanism.

An eye screw 39 is anchored within the top of the float body portion 10 and receives therethrough the fishing line 40, which extends upwardly to the fishing pole. The fishing line 40 passes over one side of the float body 10 and is knotted at 41 to an eye or aperture 42 formed at the free end of the lever 21. The line 40 then passes downwardly through another eye or ring 43, rigidly secured to the free end of the line jerking arm 13, Figure 1, and thence downwardly to the fish hook, not shown. It might be mentioned here that the device requires the use of only one line, namely the main fishing line 40 shown in the drawings, and no separate or auxiliary lines are attached to any of the working parts. Also, the depth at which the fish hook may be suspended in the water from the float 10 may be regulated as desired, by merely loosening the knot 41 and adjusting the position of the float 10 and of the entire device along the fishing line 40 to the desired point and then tightening the knot 41.

In operation, the spring 31 may be adjusted through the medium of the screw 29 to impart to the trigger 21 the desired sensitivity. When the screw 29 is adjusted downwardly to reduce the tension of the spring 31 to a minimum, the device may be sprung to the dotted line position, Figure 1, when the fish exerts a very slight tug upon the hook. Likewise, when the screw 29 is adjusted upwardly to place the spring 31 under maximum tension, a much greater tug on the fish hook is required to release the trigger 21, and with this arrangement, the fisherman can regulate the device between rather wide limits to provide for different types of fishing as found desirable. For example, when the tension of the spring 31 is great enough, the device will not spring to the broken line position for catching the fish until the entire float 10 is pulled under water. After the desired adjustment of the spring 31 is accomplished, and with the line 40 threaded through the several eyes as shown in Figure 1, the arm 13 is swung manually to the full line position of Figure 1. The element 35 will now enter between the lugs 23, and the knife edge 26 of the detent 25 will pass into the V-shaped notch 38 of the element 35, as shown in Figure 2. This will lock the arm 13 in the full line position of Figure 1, since the spring 31 will now force or hold the detent 25 in locking engagement with the notch 38.

When the fish strikes at the bait on the hook, and the line 40 is pulled downwardly, the lever or trigger 21 will be pulled downwardly or clockwise for compressing the spring 31 and shifting the knife edge 26 out of engagement with the notch 38. When this occurs, the spring 18 will instantly swing the arm 13 upwardly to the broken line position of Figure 1, and the ring 43 will jerk the line 40 upwardly and set the hook in the mouth of the fish automatically.

An important advantage of this device over certain prior art devices resides in the fact that the mechanism will not be prematurely sprung or released during casting with the fishing rod. At all times during casting, with my arrangement shown in Figure 1, the weight of the device on the fishing line 40 will cause the line to pull upwardly on the lever 21, thus tending to securely lock the arm 13 in the full line position of Figure 1. Thus, there is never any tendency for the device to be sprung prior to the downward tug by the fish upon the lever or trigger 21.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A fishing device comprising a float body portion, a line jerking arm pivotally connected with the float body portion, resilient means connected with said arm for urging it in one direction and resisting movement of the arm in another direction, a trigger lever pivotally connected with the float body portion and having a detent part, adjustable resilient means connected with the trigger lever and resisting its movement with said detent part in one direction, a latch element secured to said arm for movement therewith and shiftable into locking engagement with the detent part of the trigger lever, whereby energy is stored in the first-named resilient means, and fishing line engaging means for the float body portion, trigger lever and arm arranged so that a tug by the fish on the fish hook will shift the trigger lever in a direction for disengaging said detent part and latch element.

2. A fishing device comprising a float body portion, an arm pivotally secured to the float body portion and having a fish line engaging part, a spring associated with said arm for urging it in one direction, a trigger lever pivotally connected with the float body portion and having a part adapted for attachment to the fish line and a detent part, adjustable resilient means connected with said trigger lever for urging the trigger lever and detent part in one direction, and a latch element carried by said arm and shiftable with the arm into locking engagement with said detent part.

3. A fishing device comprising a float body portion, a mounting plate secured to the bottom of the float body portion, an arm pivotally secured to said mounting plate and having a line engaging part to jerk the line when the arm swings in one direction, resilient means connected with said arm to swing the same in said one direction, a trigger lever pivotally secured to said mounting plate and having a part adapted to be attached to the line and a beveled detent part, adjustable resilient means connected with the trigger lever for urging it and the detent part in one direction, and a notched latch element secured to said arm and swingable therewith into locking engagement with the beveled detent when the arm is swung in a direction for storing energy in the first-named resilient means.

4. A fishing device comprising a float body portion, an arm pivoted to the float body portion and having a fish line engaging element and a latch element, a spring connected with said arm to urge it in one direction, a trigger lever pivoted to the float body portion and having a pivot point and a part for attachment to the fish line on one side of its pivot point and a detent part on the other side of its pivot point for locking engagement with said latch element, an adjusting screw having screw-threaded engagement with the detent part on said other side of the pivot point of the trigger lever, a spring connected with the adjusting screw and adapted to be regulated thereby for adjusting the sensitivity of the trigger lever in response to a given pull upon the fish line by a fish, a fish line guide element secured to the float body portion near its side remote from said arm and trigger lever, and a single fish line engaging said guide element, line engaging element of said arm and part of the trigger lever.

5. A fishing device according to claim 4, wherein said arm and trigger lever are disposed at the bottom of the float body portion and said line guide element is disposed at the top of the float body portion.

6. A fishing device comprising a float body portion, a mounting plate carried by the bottom of the float body portion, a bracket dependingly secured to said mounting plate, an arm having a line engaging part to jerk the line when the arm swings in one direction, a pin engaging said bracket and arm and serving to pivotally secure the arm to the bracket, resilient means connected with the arm to swing the same in said one direction, a trigger lever movably secured to said mounting plate and having a part adapted to be attached to the line and a detent part, adjustable resilient means connected with the trigger lever for urging it and the detent part in one direction, and a latch element secured to said arm and swingable therewith into locking engagement with the detent part when the arm is swung in a direction for storing energy in the first-named resilient means.

7. A fishing device comprising a float body portion, a mounting plate carried by the bottom of the float body portion, an arm pivotally secured to said mounting plate and having a line engaging part to jerk the line when the arm swings in one direction, resilient means connected with said arm to swing the same in said one direction, a trigger lever having a part adapted to be attached to the line and a detent part, a depending lug secured to the mounting plate, a pin pivotally connecting the trigger lever to said lug, adjustable resilient means connected with the trigger lever for urging it and the detent part in one direction, and a latch element carried by said arm and swingable therewith into locking engagement with the detent part when the arm is swung in a direction for storing energy in the first-named resilient means.

References Cited in the file of this patent

UNITED STATES PATENTS

| | | |
|---|---|---|
| 834,414 | Schmidt | Oct. 30, 1906 |
| 1,866,864 | Schroeder | July 12, 1932 |